United States Patent
Hathi et al.

(10) Patent No.: US 11,510,157 B1
(45) Date of Patent: Nov. 22, 2022

(54) ADAPTIVE THRESHOLDS FOR SPATIAL REUSE

(71) Applicant: Arista Networks, Inc., Santa Clara, CA (US)

(72) Inventors: Preyas Hathi, Pune (IN); Nadeem Akhtar, Mumbai (IN); Jatin J Parekh, Mumbai (IN)

(73) Assignee: Arista Networks, Inc., Santa Clara, CA (US)

( * ) Notice: Subject to any disclaimer, the term of this patent is extended or adjusted under 35 U.S.C. 154(b) by 3 days.

(21) Appl. No.: 17/351,038

(22) Filed: Jun. 17, 2021

(51) Int. Cl.
*H04W 52/36* (2009.01)

(52) U.S. Cl.
CPC ................ *H04W 52/367* (2013.01)

(58) Field of Classification Search
CPC .......... H04W 52/0206; H04W 52/367; H04W 88/08
See application file for complete search history.

(56) References Cited

U.S. PATENT DOCUMENTS

| | | | |
|---|---|---|---|
| 10,827,359 B2* | 11/2020 | Cherian | H04W 76/11 |
| 2017/0055177 A1* | 2/2017 | Son | H04W 28/0278 |
| 2017/0188368 A1* | 6/2017 | Cariou | H04W 74/0808 |
| 2017/0223710 A1* | 8/2017 | Cariou | H04W 52/247 |
| 2017/0255659 A1* | 9/2017 | Cariou | G09G 5/393 |
| 2018/0084554 A1* | 3/2018 | Chu | H04L 5/0007 |
| 2021/0352483 A1* | 11/2021 | Bhanage | H04W 16/14 |

OTHER PUBLICATIONS

Francesc Wilhelmi et al., "On the Performance of the Spatial Reuse Operation in IEEE 802.11ax WLANs", Sep. 17, 2019., 6 pages.
Francesc Wilhelmi et al., "Spatial Reuse in IEEE 802.11ax WLANs", Nov. 29, 2019., 40 pages.

* cited by examiner

*Primary Examiner* — Raymond S Dean
(74) *Attorney, Agent, or Firm* — Fountainhead Law Group, P.C.

(57) ABSTRACT

Transmission thresholds for IEEE 802.11ax Spatial Reuse (SR) opportunities are set adaptively. A group retry rate is defined and used to quantify the level of interference in a Spatial Reuse Group (SRG). Access points in the SRG update their $OBSS\text{-}PD_{max}$ thresholds so as to keep the group retry rate value acceptably low. Access points transmit during an SR opportunity subject to the constraints imposed by the updated $OBSS\text{-}PD_{max}$.

20 Claims, 6 Drawing Sheets

| | Uplink RSSI | |
|---|---|---|
| | AP1 | AP2 |
| STA11 | ≥ -65 dBm | < -65dBm |
| STA12 | ≥ -65 dBm | ≥ -65 dBm |
| STA21 | < -65dBm | ≥ -65 dBm |
| STA22 | < -65dBm | ≥ -65 dBm |

| Packet No. | STA-ID | Access Category | Packet Size (Bytes) | Transmission Duration (ms) | Queuing Delay (ms) |
|---|---|---|---|---|---|
| 1 | STA20 | Video | 1000 | 18.2 | 50 |
| 2 | STA5 | Voice | 40 | 1.3 | 10 |
| 3 | STA1 | Voice | 40 | 1.1 | 20 |
| 4 | STA5 | Video | 1500 | 49.2 | 25 |
| 5 | STA15 | Background | 1200 | 54.7 | 100 |

| STA-ID | MCS | Bandwidth | NSS | Date rate (Mbps) | Minimum Tx Power (dBm) |
|---|---|---|---|---|---|
| STA1 | 7 | 40 | 2 | 292.5 | 15 |
| STA5 | 11 | 20 | 2 | 243.8 | 21 |
| STA15 | 8 | 20 | 2 | 175.5 | 18 |
| STA20 | 10 | 40 | 2 | 438.8 | 19 |

ADAPTIVE THRESHOLDS FOR SPATIAL REUSE

CROSS REFERENCE TO RELATED APPLICATIONS

Pursuant to 35 U.S.C. § 119(a), this application is entitled to and claims the benefit of the filing date of Application No. 202141022794 filed May 21, 2021 in India, the content of which is incorporated herein by reference in its entirety for all purposes.

This application is related to U.S. application Ser. No. 17/028,932 filed Sep. 22, 2020, the content of which is incorporated herein by reference in its entirety for all purposes.

BACKGROUND

The Institute of Electrical and Electronics Engineers (IEEE) 802.11 family of specifications define the underlying technology for implementing WiFi. Spatial Reuse (SR) is a feature introduced in the IEEE 802.11ax standard, or simply 802.11ax. Spatial reuse refers to the idea that an 802.11ax access point (AP) and stations (clients) comprising a basic service set (BSS) can transmit on the same channel in parallel (concurrently) as another BSS, allowing for overlapping BSS (OBSS) transmissions on the same channel.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
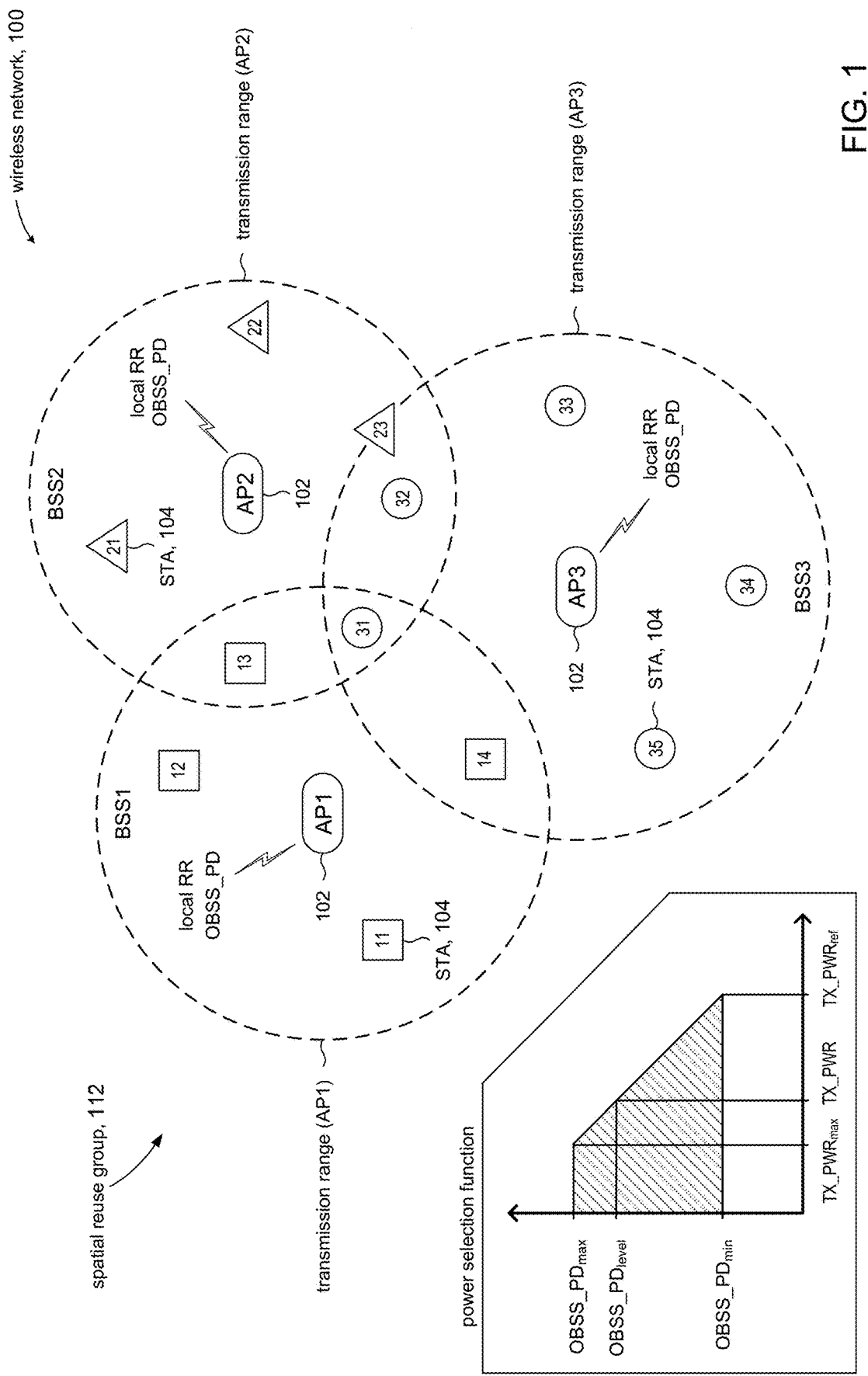
FIG. 1 shows a configuration of APs with overlapping BSSs in accordance with the present disclosure.

FIG. 1 shows an illustrative wireless network that operates in accordance with the present disclosure. Wireless network 100 includes a deployment of three access points (APs) 102. Each AP is characterized by an operating range (transmission and reception) that depends on the transmission power of the AP. For example, in some embodiments the transmission range of an AP can be defined as the distance from the AP where the power level of a signal transmitted by the AP has fallen to −82 dBm.

Each AP can be associated with (associated to) one or more client stations 104 that are in wireless communication with the AP, and together constitute a basic service set (BSS). Client stations will also be referred to herein simply as "stations" or "clients." FIG. 1 shows a basic service set BSS1 comprising access point AP1 and its associated stations 11-14, BSS2 comprising AP2 and its associated stations 21-23, and BSS3 comprising AP3 and its associated stations 31-35. All members of a BSS operate (transmit and receive) on the same channel. All BSSs that use the same radio in an AP operate on the same channel. The BSSs of different APs can operate on the same channel or on different channels. Notably, for purposes of the present disclosure, FIG. 1 shows that the transmission ranges of the BSSs overlap. For example, the transmission range of BSS1 overlaps with the transmission ranges of BSS2 and BSS3. BSS2 and BSS3 overlap, and so on. The BSSs operate on the same channel.

In accordance with some embodiments, APs 102 can operate in accordance with the 802.11ax standard for wireless communication. 802.11ax introduces a feature called spatial reuse (SR) that allows for concurrent transmission of co-channel APs and their associated stations despite the fact that they operate overlapping BSSs. An AP and its associated stations, operating in accordance with 802.11ax, can transmit on a channel in parallel with an ongoing overlapping basic service set (OBSS) transmission on the same channel.

An AP or a station that operates using SR to transmit in parallel with an ongoing co-channel transmission, adjusts its transmit (Tx) power depending on a detected OBSS-power level ($OBSS\_PD_{level}$) to avoid interfering with the ongoing transmission. The power selection function shown in the inset in FIG. 1 can inform the AP of the maximum allowable transmit power (TX_PWR) for a given detected $OBSS\_PD_{level}$. The transmit power adjustment essentially keeps interference on the channel at an acceptably low level. When the detected $OBSS\_PD_{level}$ is high, the SR transmission is done using a relatively lower transmit power. Conversely, when the detected $OBSS\_PD_{level}$ is low, the AP will transmit with a relatively higher transmit power.

802.11ax also introduces the idea of a spatial reuse group (SRG), which is a group of BSSs such that all BSSs in the SRG use the same OBSS_PD thresholds ($OBSS\_PD_{max}$ and $OBSS\_PD_{min}$). For discussion purposes, we can assume without loss of generality, that each AP in FIG. 1 represents a single BSS with the understanding that an AP can define two or more BSSs. AP1, AP2, AP3 in FIG. 1 constitute spatial reuse group 112. Because the transmit power during an SR transmission depends on $OBSS\_PD_{level}$, forming a group of APs with common OBSS_PD thresholds becomes a way for multiple co-channel APs and stations to agree upon and maintain a mutually acceptable interference level. In other words, APs in an SRG and their stations coordinate spatial reuse by using the same OBSS_PD thresholds.

802.11ax does not specify how to determine or otherwise compute values for the OBSS_PD thresholds. Accordingly, in accordance with the present disclosure, APs 102 in SRG 112 can be configured to compute or otherwise determine $OBSS\_PD_{max}$ based on a quantity referred to herein as the group retry rate ($RR_{SRG}$). As shown in FIG. 1 in accordance with the present disclosure, APs in an SRG can generate respective locally computed retry rates (local RR) and share their local retry rates with each other over a suitable communication channel. In some embodiments, for example, the APs can communicate their local retry rates with each other wirelessly as depicted in FIG. 1. In other embodiments, not shown, the APs can be interconnected by a wired network (e.g., Ethernet) and communicate their local retry rates with each other over the wired network. The APs can communicate their local retry rates with each other using a central controller, and so on.

In accordance with the present disclosure, each AP can repeatedly share its local retry rate with other APs in the SRG. Each AP can independently determine or otherwise compute the group retry rate using the local retry rates received from the other APs in the SRG. Each AP can use the group retry rate to compute $OBSS\_PD_{max}$, which can then be beaconed to its associated stations to enable spatial reuse by APs and stations in the SRG. The process is repeated in order to adjust to a changing radio frequency (RF) environment, to changes in the radio-related configuration of APs, or to other conditions that affect transmission quality. The discussion will now turn to a description for determining or otherwise computing values for the OBSS_PD thresholds in accordance with embodiments of the present disclosure.

Figure 2:
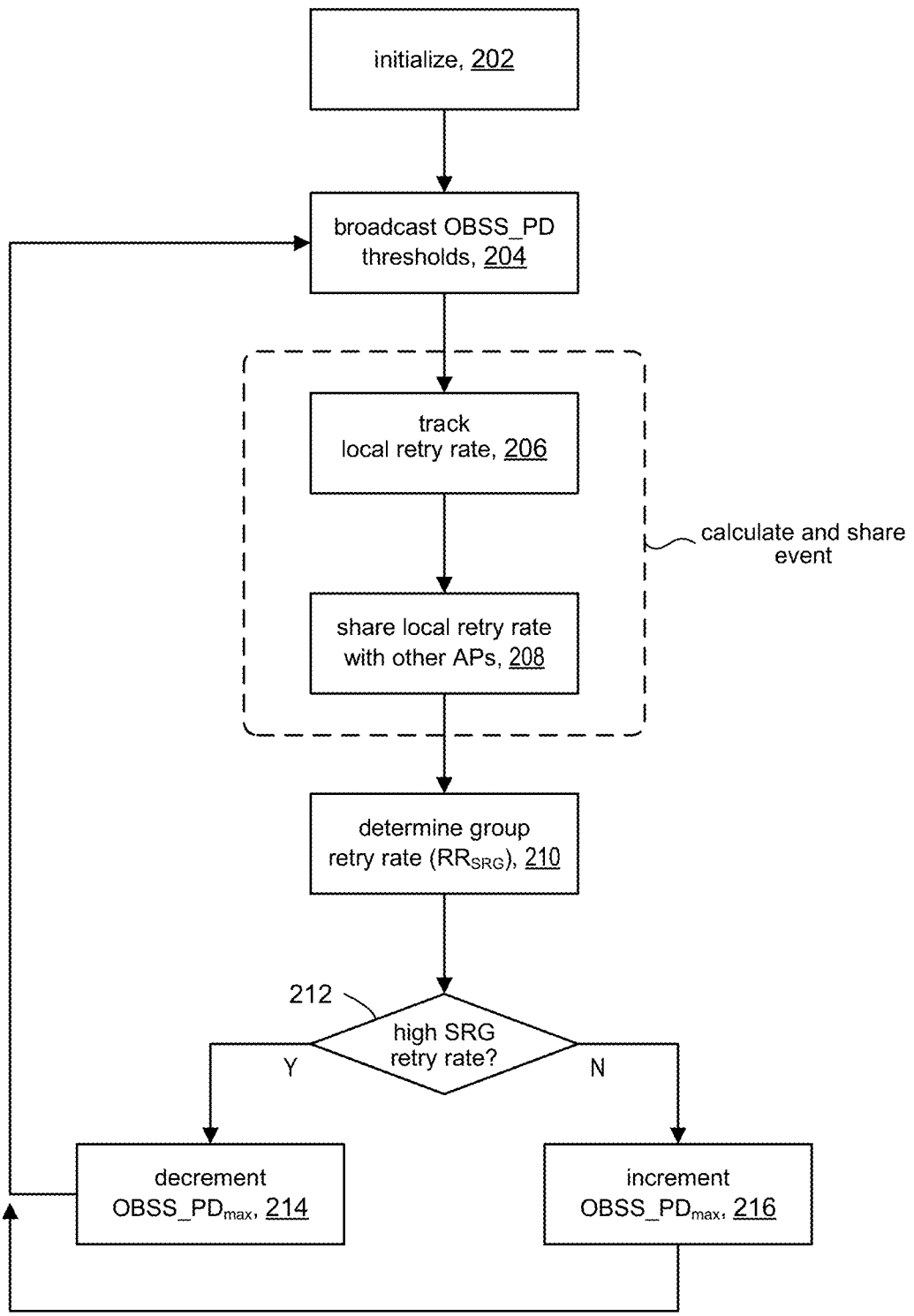
FIG. 2 shows operations for updating $OBSS\_PD_{max}$ in accordance with the present disclosure.

Referring to FIG. 2, the discussion will now turn to a high level description of processing in an access point (e.g., AP 102) for computing OBSS_PD thresholds in accordance with the present disclosure. In some embodiments, for example, the AP can include computer executable program code, which when executed by a processor (e.g., 812, FIG. 8), can cause the computer system to perform operations in accordance with FIG. 2.

At operation 202, the AP can initialize some working parameters. In some embodiments, for example, the AP can perform this initialization when the device boots up, when the device is reset or otherwise restarted, or by a network administrator. In some embodiments, the following parameters can be initialized:

$OBSS\_PD_{min}$—the lower bound on the power selection function in FIG. 1

$OBSS\_PD_{max}$—the upper bound on the power selection function in FIG. 1

$RR_{max}$—a maximum acceptable retry rate

These parameters can be pre-programmed, for example, in the AP's firmware. In other embodiments, the parameters can be programmed in the AP by a network administrator, via a central controller, and so on.

Initialize $OBSS\_PD_{min}$ $OBSS\_PD_{min}$ can be set according to any suitable criteria. In some embodiments, for example, $OBSS\_PD_{min}$ can be set based on a received signal strength indication (RSSI). The RSSI is generally a widely used measure of signal strength across devices and technologies for wireless communications. As used in the context of APs, the RSSI serves to indicate the signal strength of the beacon signal transmitted periodically by an AP or of packets transmitted intermittently by the AP, such as data packets, management packets, control packets, etc. Commonly owned U.S. application Ser. No. 17/028,932, for example, discloses using RSSI to determine if an AP is in radio frequency (RF) proximity to another AP. U.S. application Ser. No. 17/028,932, discloses a minimum received signal strength indication ($RSSI_{min}$) to define an SRG. If the measured RSSI for a given detected beacon is greater than or equal to $RSSI_{min}$, then the AP that transmitted the beacon can be deemed to be in RF proximity to the receiving AP and in the same SRG as the receiving AP. If the RSSI is less than $RSSI_{min}$, then the transmitting AP can be deemed to be not RF proximate to the receiving AP and not in the same SRG as the receiving AP. In some embodiments of the present disclosure, $OBSS\_PD_{min}$ can be set to $RSSI_{min}$. APs and stations need not defer spatial reuse for OBSS_PD levels lower than $OBSS\_PD_{min}$.

Initialize $OBSS\_PD_{max}$

Figures 3A, 3B:
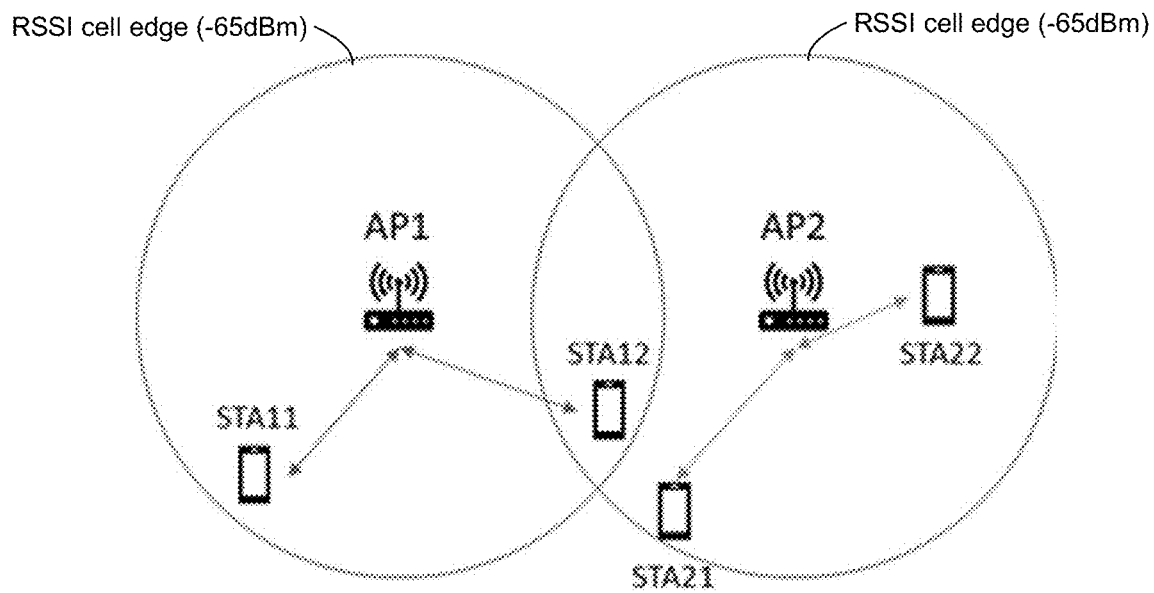
FIGS. 3A and 3B illustrate a configuration for initializing $OBSS\_PD_{max}$ in accordance with some embodiments.

Referring to FIGS. 3A and 3B for a moment, consider a configuration comprising two co-channel APs, AP1 and AP2, each serving their respective client stations. Suppose we have the following configuration: (1) the network is designed to provide at least −65 dBm uplink RSSI; and (2) AP1 and AP2 are configured to hear each other with RSSI less than −65 dBm.

Based on this configuration, the uplink RSSI of the clients, as seen by the APs is shown in FIG. 3B. Consider the following SR scenarios using the information in FIG. 3B:

1. Consider the scenarios where the active link is STA21 transmitting to AP2; we have:
   a. RSSI of STA21 determined at AP1 is <−65 dBm
   b. RSSI of AP1 determined at AP2 is <−65 dBm
   c. thus, if $OBSS\_PD_{max}$ at AP1≥−65 dBm, AP1 can transmit concurrently with STA21

2. Consider the scenarios where the active link is AP2 transmitting to STA21; we have:
   a. RSSI of AP2 determined at AP1<−65 dBm
   b. thus, if $OBSS\_PD_{max}$ at AP1≥−65 dBm, AP1 can transmit concurrently with AP2

In both cases, we note that if $OBSS\_PD_{max}$ at AP1 is greater than the cell edge threshold, namely −65 dBm, AP1 has an SR opportunity. In other words, AP1 can transmit concurrently on the same channel as AP2. Accordingly, in some embodiments, this motivates setting the initial value of $OBSS\_PD_{max}$ as:

$$OBSS\_PD_{max} = RSSI\_cell\text{-}edge - OBSS\_PD_{max}\ margin$$

where $OBSS\_PD_{max}$ margin is a positive number whose value lies between 0 and (RSS_Cell-edge−RSSI_Steering_Threshold). Steering refers to urging a client to switch from a weaker AP to a stronger AP as the client roams. The quantity RSSI_Steering_Threshold refers to the lower limit of the computed RSSI when an AP will terminate its connection with the client.

$RR_{max}$

Returning to FIG. 2 and continuing with initialization operation 202, the $RR_{max}$ parameter refers to a tolerable retry rate that is used in the present disclosure. The retry rate refers to the number of data frame re-transmissions seen by the AP. A frame re-transmission can be made by the AP or by a client associated with the AP. In the case of client re-transmissions, information in a frame transmitted by a client, and received by the AP, informs the AP whether the frame has been re-transmitted or not.

At operation 204, the AP can transmit a beacon on a periodic basis set by a beacon interval. The beacon contains the AP's current OBSS_PD threshold values (including $OBSS\_PD_{min}$ and $OBSS\_PD_{max}$) and other operational data and is periodically transmitted at intervals referred to as beacon intervals. The beaconed OBSS_PD threshold values can be received by clients associated with the AP. Clients receiving the beacon can transmit packets using SR in accordance with OBSS_PD threshold values contained in the beacon. Generally, the AP transmits beacon independently of other activities going on in the AP.

At operation 206, the AP can keep track of its local retry rate. In some embodiments, the retry rate can represent the number of re-transmissions expressed as a percentage of the total number of frames transmitted during a predetermined period of time. In some embodiments, the retry rate can be based only on activity in the AP, where the retry rate is computed using the total number of frames transmitted by the AP and the number of re-transmissions made by the AP. For example, if the AP transmitted 100 frames in a given period of time and the AP re-transmitted 15 of those frames, the retry rate during that given period of time is 15%. In other embodiments, the retry rate can be based only on the transmission activity of the associated clients, where the retry rate is computed using the total number of frames received by the AP from all associated clients and the number of those frames that were indicated as being re-transmissions. In other embodiments, the retry rate can be based on the transmission/re-transmission activity in both the AP and the clients.

The AP can track its retry rate in any of several ways. For example, in some embodiments the AP can maintain two counters, one counter for the number of frames transmitted and another counter for the number re-transmissions. The retry rate can be computed at the time the AP shares (operation 208) its retry rate with the other APs in the SRG; the counters can be reset each time the retry rate is shared. As another example, the retry rate can be updated dynamically, where the retry rate is updated each time a frame is transmitted and each time a re-transmission is detected.

At operation 208, the AP can share its local retry rate with other APs in the SRG. The sharing mechanism can use any suitable communication method used by the APs to communicate with each other. In some embodiments, for example, the APs can use one-to-many multicast transmissions on a wired network to communicate with each other. In other embodiments, the APs may employ a proprietary beacon-based messaging system, the APs may communicate through a central server, and so on.

In accordance with the present disclosure, operations 206, 208 can be repeated on a continuing basis. For example, the operations can be periodically triggered based on a suitable period of time. In some embodiments, for example, the triggering event can be based on inter-AP sync intervals. APs in an SRG can exchange various operational data (e.g., client information, authentication parameters that help in "fast roaming," etc.) with each other, for example, using wireless transmissions, via a wired network, from a central server, and so on. The inter-AP sync interval is the interval at which an AP exchanges such information with other APs in the SRG. The triggering event can be the passage of N inter-AP sync intervals. For example, the AP can compute its local retry rate as the number of re-transmissions seen by the AP during the period of time equal to N inter-AP sync intervals, expressed as a percentage of total transmissions seen by the AP during that period of time. In other embodiments, the triggering event can be the expiration of a timer, and so on.

In some embodiments, the triggering event that invokes operations 206, 208 can arise independently of any periodic triggering event; i.e., in asynchronous fashion. In some embodiments, for example, the triggering event can be a queue-full event in the APs packet queue or in the packet queue of a client of the AP; for example, a client can signal a packet queue build up by transmitting a Buffer Status Report. Operations 206, 208 can be triggered when a client reports its own retry rate. Changes in the RF conditions, such as new APs and/or new clients can also serve as a triggering event to invoke operations 206, 208. Changes in the RF configuration (e.g., channel reassignment, transmit power reconfiguration, etc.) can also serve as a trigger. An AP reboot or reset can serve as a trigger. Operations 206, 208 can be triggered manually by a network administrator (for example, because of a reboot or an RF configuration change), and so on.

As discussed in more detail below, each AP updates the group retry rate $RR_{SRG}$ using local retry rates received from the other APs in the SRG, which in turn is used to update $OBSS\_PD_{max}$. The periodic triggering event ensures that the APs receive the local retry rates from the other APs on a regular basis. Asynchronous triggering events can occur in addition to the periodic trigger to account for unusual conditions/situations, such as those described above.

Accordingly, in the case of an asynchronous triggering event, the AP that generated the asynchronous trigger can inform the other APs in the SRG to share their respective retry rates with the other APs. This ensures the $RR_{SRG}$ can be updated with the latest retry rates.

Continuing with FIG. 2, at operation 210, the AP can update the group retry rate $RR_{SRG}$. In accordance with some embodiments, each AP maintains and updates its own copy of $RR_{SRG}$. Because the group retry rate is a quantity based on the local retry rates of the APs in the SRG, the group retry rate can serve as an indicator of systemic changes in the RF environment of the SRG, and changes in the operating conditions among the APs and stations comprising the SRG. In general, the group retry rate can be used as an indicator of any changes that affect the quality of transmitted frames among APs and stations in the SRG, and hence the number of re-transmissions.

In some embodiments, the AP can use the SRG bitmap defined by 802.11ax to identify other APs in the SRG. For example, the AP can use the SRG bitmap to track which APs in the SRG have sent their respective local retry rates and determine when a retry rate has been received from every other AP in the SRG. In some embodiments, $RR_{SRG}$ can be set to the maximum retry rate from among the local retry rates reported by all the APs in the SRG. In other embodiments, $RR_{SRG}$ can be an average of the reported retry rates, and in general can be any suitable measure computed from the reported retry rates.

In some embodiments, $RR_{SRG}$ can be determined only from local retry rates that are based on a predetermined minimum number ($Packets_{min}$) of total transmissions. For example, a given AP in the SRG may report a retry rate of 70%, whereas the other APs in the SRG all report retry rates less than 40%. If that given AP's retry rate was based on only ten transmissions, seven of which were re-transmissions, then that AP's retry rate may not be an accurate indication of the RF conditions of the SRG. The $Packets_{min}$ parameter can be used to avoid skewing of the $RR_{SRG}$ by excluding such anomalous retry rates from the received retry rates when determining $RR_{SRG}$. In some embodiments, for example, APs in the SRG can share with each other the number of transmissions that their respective retry rates were based on. The AP can then use $Packets_{min}$ to filter out the anomalous retry rates.

The group retry rate $RR_{SRG}$ can be repeatedly updated in order to detect changes (improvements or deterioration) in the operating conditions of the SRG over time. As explained above in connection with operations 206, 208, APs in the SRG repeatedly share their local retry rates with each other. An AP updates $RR_{SRG}$ when the AP has received a local retry rate from every AP in the SRG. Accordingly, to the extent that an AP repeatedly receives retry rates from the other APs in the SRG, the $RR_{SRG}$ is likewise repeatedly updated.

At decision point 212, if $RR_{SRG}$ is deemed to be unacceptably high, the AP can proceed to operation 214. If $RR_{SRG}$ is not deemed to be unacceptably high, the AP can proceed to decision point 216. In some embodiments, for example, $RR_{max}$ described above can be used to determine if $RR_{SRG}$ is too high or not. Accordingly in some embodiments, $RR_{SRG} \geq RR_{max}$ can mean that $RR_{SRG}$ is deemed to be too high.

At operation 214, when $RR_{SRG}$ is deemed to be too high, the AP can decrement $OBSS\_PD_{max}$. A high $RR_{SRG}$ indicates that the transmit power of some transmissions are too high, resulting in failed transmissions. Reducing $OBSS\_PD_{max}$ reduces the permissible maximum transmit power ($TX\_PWR_{max}$ in the power selection function in FIG. 1) in an attempt to reduce the retry rate. In some embodiments, the current value of $OBSS\_PD_{max}$ can be updated (reduced) according to:

if $OBSS\_PD_{MAX} > OBSS\_PD_{MIN} + 2 \times OBSS\_PD_{DEC\text{-}STEP}$ $OBSS\_PD_{MAX} -= OBSS\_PD_{DEC\text{-}STEP}$ else $OBSS\_PD_{MAX}$ is its current value where $OBSS\_PD_{DEC\text{-}STEP}$ is a predetermined decrement step value that can be heuristically determined, for example, 2 dB.

The "if" condition ensures that $OBSS\_PD_{max}$ is at some minimum value above $OBSS\_PD_{min}$, as a precondition to updating (decrementing) $OBSS\_PD_{max}$. More specifically, the conditional ensures that the updated $OBSS\_PD_{max}$ remains above $OBSS\_PD_{min}$ by a certain margin, namely $OBSS\_PD_{DEC\text{-}STEP}$. If the minimum is not met, then the "updated" value of $OBSS\_PD_{max}$ is simply its current value. Processing can proceed to operation 204 where the AP can broadcast the updated $OBSS\_PD_{max}$ to its associated clients in the next beacon.

At operation 216, when $RR_{SRG}$ is not deemed to be too high, the AP can increment $OBSS\_PD_{max}$. If $RR_{SRG}$ is not too high, it may be too low, which could indicate that the transmit power may be set too low, which in turn suggests the possibility of unrealized SR opportunities. Increasing $OBSS\_PD_{max}$ will allow the APs to take advantage of any unrealized SR opportunities. In some embodiments, the current value of $OBSS\_PD_{max}$ can be updated (increased) according to:

if $OBSS\_PD_{MAX} < (-62 \text{ dBm} - OBSS\_PD_{INC\text{-}STEP})$ $OBSS\_PD_{MAX} += OBSS\_PD_{INC\text{-}STEP}$ else $OBSS\_PD_{MAX}$ is its current value where $OBSS\_PD_{INC\text{-}STEP}$ is a predetermined increment step value that can be heuristically determined, for example, 2 dB.

The "if" condition ensures that $OBSS\_PD_{max}$ will remain below a ceiling that is defined by 802.11ax, namely −62 dBm, after being updated. More specifically, the conditional ensures that $OBSS\_PD_{max}$ will remain below the 802.11ax ceiling by a certain margin, namely $OBSS\_PD_{INC\text{-}STEP}$. If the condition is not met, the "updated" value of $OBSS\_PD_{max}$ is simply its current value. Processing can proceed to operation 204 where the AP can broadcast the updated $OBSS\_PD_{max}$ to its associated clients in the next beacon.

Persons of ordinary skill will appreciate that updating $OBSS\_PD_{max}$ in accordance with FIG. 2 applies on a per BSS basis. The updated $OBSS\_PD_{max}$ is used by members (AP and stations) in the BSS so that they can safely transmit packets concurrently with ongoing transmissions in a different (overlapping) BSS that is on the same channel.

It is worth noting that FIG. 2 can be adapted for APs in a non-SRG configuration, where the AP makes updates to its own $OBSS\_PD_{max}$ and broadcasts the update to its stations (operation 204). The non-SRG AP would not receive retry rates from other APs and can use its local retry rate in place of an $RR_{SRG}$; the non-SRG AP would not share its local retry rate (operation 208) with other APs.

It is further worth noting that FIG. 2 can be adapted for centralized operation. Although not shown in FIG. 1, wireless network 100 can include a central controller that is in communication with each AP 102, for example, via a wired network. The APs in the SRG can communicate their respective local retry rates to the central controller rather than exchanging the retry rates with each other. The central controller can compute $RR_{SRG}$ and update $OBSS\_PD_{max}$ in accordance with FIG. 2. The central controller can then distribute the updated $OBSS\_PD_{max}$ to the APs via the wired network.

Figure 4:
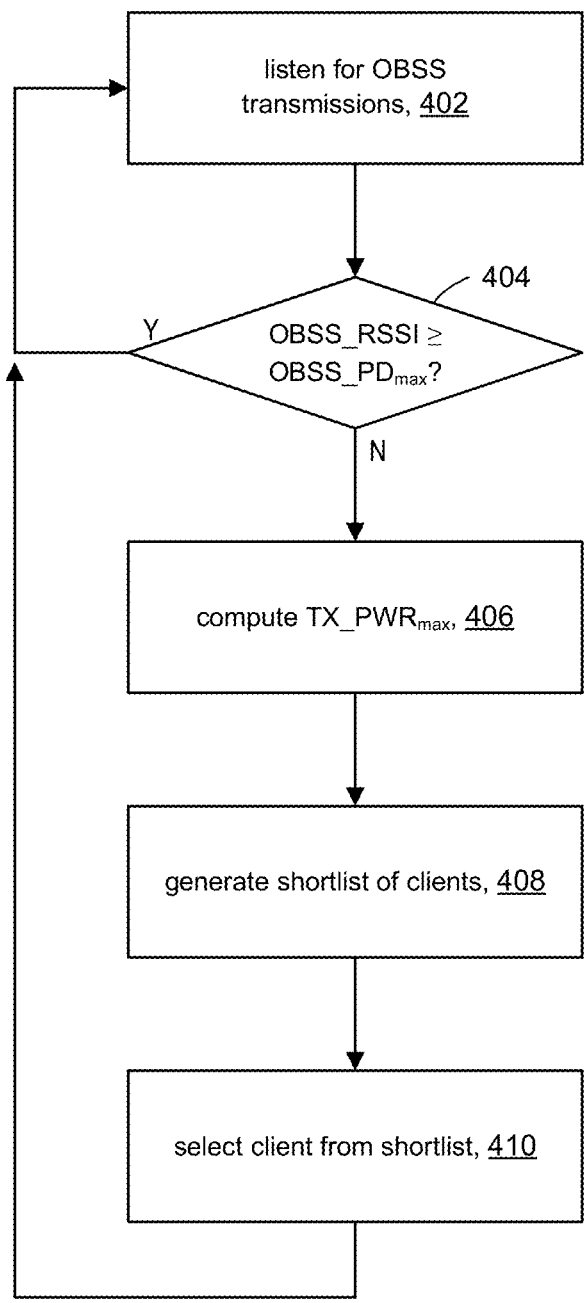
FIG. 4 illustrates client selection for spatial reuse transmissions in accordance with some embodiments.

Referring to FIG. 4, the discussion will now turn to a high level description of processing in an access point (e.g., AP 102) for transmitting frames in accordance with the present disclosure. In some embodiments, for example, the AP can include computer executable program code, which when executed by a processor (e.g., 812, FIG. 8), can cause the computer system to perform the processing in accordance with FIG. 2.

At operation 402, the AP can listen for an OBSS transmission, which is a packet transmitted on the same channel as the AP but in a different BSS. The AP can compute the RSSI for a received OBSS transmission; this RSSI is referred to as the OBSS_RSSI and represents the signal level of the received OBSS transmission.

At decision point 404, if the OBSS_RSSI is greater than or equal to the current value of $OBSS\_PD_{max}$, then the AP can defer transmissions and return to operation 402 to listen for another OBSS transmission. If the OBSS_RSSI is less than the current value of $OBSS\_PD_{max}$, then the AP can continue processing at operation 406. When $OBSS\_RSSI < OBSS\_PD_{max}$, this means there is an SR opportunity. In other words, there is an opportunity to transmit on the same channel that another BSS is currently transmitting on without risk of corrupting either transmission, so processing can proceed to operation 406.

At operation 406, when there is an SR opportunity, the AP can prepare to select and transmit a packet. This includes the AP computing a maximum transmit power ($TX\_PWR_{max}$) in accordance with 802.11ax:

$TX\_PWR_{MAX} = TX\_PWR_{REF} - (OBSS\_RSSI - OBSS\_PD_{MIN})$, where $TX\_PWR_{max}$ represents the maximum transmit power level for transmitting a packet in this SR opportunity, and $TX\_PWR_{ref}$ is determined according to 802.11ax.

At operation 408, the AP can generate a shortlist of clients as candidates for packet transmission. In some embodiments, an initial starting set of clients can be clients for which the AP has packets enqueued for transmission. In some embodiments, the starting set of clients can be shortlisted based on $TX\_PWR_{max}$. In some embodiments, the starting set of clients can be shortlisted based on both $TX\_PWR_{max}$ and the expected interference level at each client due to an ongoing OBSS transmission signal-to-interference ratio (SIR). The 802.11 standard defines a set modulation coding scheme (MCS) indices, where each index specifies a combination of transmission parameters such as the modulation type, coding rate, and the like. A packet transmitted using a certain MCS must be transmitted at a high enough power for the receiver to successfully decode the packet at that MCS. Accordingly, the AP can use its MCS-TxPWR table (e.g., FIG. 7) to look up the minimum transmit power required for each pending client based on that client's MCS. The AP can exclude those clients for whom the required minimum transmit power is greater than $TX\_PWR_{max}$. The AP can further exclude clients for which their packet size (e.g., FIG. 6) results in a transmission time that would exceed the duration of the OBSS transmission (the SR TxOP limit). The resulting shortlist represents those clients to which the AP can transmit a packet during this SR opportunity.

At operation 410, the AP can select a client from the shortlist and transmit the next packet from the selected client's packet queue. In some embodiments, for example, the selection can be made to maximize a utility metric, such as shortest airtime, highest Access Category (AC, e.g., voice, video, best effort, background), shortest deadline (time by which packet must be transmitted), etc. The packet can be transmitted at a power level required by the client's MCS, which is guaranteed to be less than $TX\_PWR_{max}$ because of the shortlisting at operation 408. Processing can return to operation 402 to listen for another SR opportunity.

It is worth noting that updating $OBSS\_PD_{max}$ (FIG. 2) and looking for SR opportunities (FIG. 4) can occur in the AP as independent activities. On the one hand, $OBSS\_PD_{max}$ is updated whenever $RR_{SRG}$ is too high. On the other hand, SR opportunities are identified by listening for OBSS transmissions.

It is further worth noting that because the OBSS_PD thresholds are beaconed by the AP and received by the associated clients, the clients can also look for SR opportunities in accordance with FIG. 4 using the received OBSS_PD thresholds.

The discussion will now turn to a description of an example to illustrate updating and using $OBSS\_PD_{max}$ in accordance with the present disclosure. The following initial values will be used:

$OBSS\_PD_{min}=-75$ dBm
$OBSS\_PD_{max}=-65$ dBm
$OBSS\_RSSI=-70$ dBm
$OBSS\_PD_{INC\text{-}STEP}=OBSS\_PD_{DEC\text{-}STEP}=2$ dB
$RR_{max}=20\%$, in other words, a retry rate<20% is considered acceptable
$TX\_PWR_{ref}$ for the AP=25 dBm
Channel width=20 MHz Referring to FIG. 2, suppose at some inter-AP sync interval an AP in the SRG reports (operation 208) a local retry rate of 30%. Suppose further this is the highest retry rate among the APs. Accordingly, $RR_{SRG}$ will be 30% (operation 210). Because $$RR_{SRG}>RR_{MAX}\text{ (decision point 212),}$$

this will trigger an update of $OBSS\_PD_{max}$ (operation 214). As explained above, because $$OBSS\_PD_{MAX}>OBSS\_PD_{MIN}+2\times OBSS\_PD_{DEC\text{-}STEP}$$
$$(\text{i.e., }-65>-75+2\times 2),$$

$OBSS\_PD_{max}$ will be decremented by $OBSS\_PD_{DEC\text{-}STEP}$ to yield $$OBSS\_PD_{MAX}=-67\text{ dBm.}$$

$OBSS\_PD_{max}$ is then broadcast (operation 204) to clients in the BSS.

In a non-SRG AP, the same result is obtained. However, the AP will use its own local retry rate as the trigger for updating $OBSS\_PD_{max}$; there is no sharing of the local retry rate with other APs.

Referring to FIG. 4 and continuing with the above example, suppose a detected OBSS transmission (operation 402) has an $OBSS\_RSSI=-70$ dBm. Because $$OBSS\_PD_{MAX}(-67\text{ dBm})>OBSS\_RSSI,$$

the RSSI indicates an SR opportunity and so the AP decides to transmit a packet (decision point 404).

Figures 5, 6, 7:
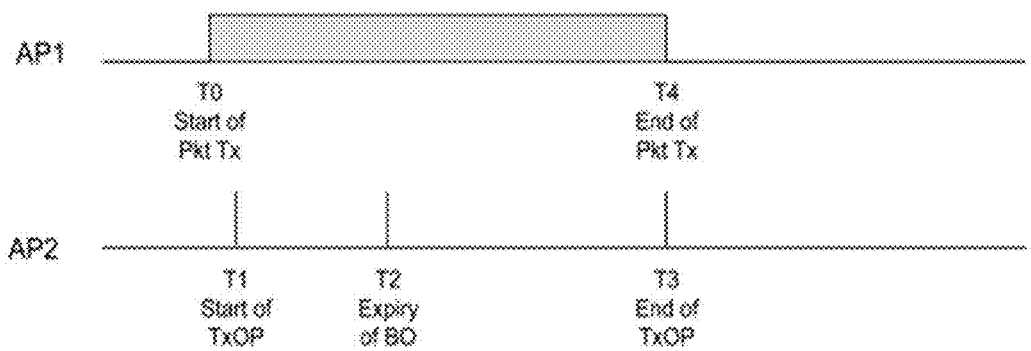
FIG. 5 shows an example configuration to illustrate packet selection in accordance with the present disclosure.
FIG. 6 shows an example of a client packet queue to illustrate packet selection in accordance with the present disclosure.
FIG. 7 shows an example of an MCS-TxPWR table to illustrate packet selection in accordance with the present disclosure.

FIG. 5 shows SR TxOP start and end times for two APs, AP1 and AP2. At T0, AP1 starts transmitting a packet to one of its associated stations. The packet header indicates that the transmission will end at T4. At time T1, AP2 determines that it has a SR TxOP (note that AP2 needs to receive and decode the initial part of AP1's transmission to determine if it is an inter-BSS PPDU). At time T1, AP2 starts its Backoff (BO) Timer which expires at time T2, at which point AP2 can transmit a packet. However, this packet transmission must finish by T3 (=T4). Accordingly, the total airtime available for AP2 is T3−T2.

Suppose for discussion purposes, the packet queue in AP2 contains the information shown in FIG. 6. This represents the initial list of pending clients for which the AP has packets enqueued for transmission (operation 408). The transmission duration for each of the clients listed in FIG. 6 can be computed based on the example of client data rates shown in the MCS-TxPWR table in FIG. 7.

The MCS index values for each client can be learned by AP2, for example, as an outcome of using a suitable link adaptation algorithm. Referring back to FIG. 5, for discussion purposes, assume that T3−T2=20 ms; in other words, AP2 has a 20 ms window to transmit a packet. We can see in FIG. 6 that only the first 3 packets from AP2's packet queue are eligible for transmission during the SR TxOP because their transmission durations are all less than 20 ms. This reduces the initial list of pending clients to clients STA20, STA5, STA1 (operation 408).

Based on the initial conditions above, $TX\_PWR_{max}=20$ dBm (operation 406), we can further exclude STA5 because FIG. 7 shows that STA5 requires 21 dBm of transmission power, which is greater than $TX\_PWR_{max}$. This leaves a final shortlist comprising STA20 and STA1 (operation 408).

Between STA20 and STA1, AP2 can choose the packet to be transmitted based on multiple considerations. The table below illustrates how different utility metrics can lead to different choices (operation 410):

| Selection Criteria | Packet No. |
| --- | --- |
| Minimum Airtime | 3 |
| Highest Priority | 1 |
| Lowest Tx Power | 3 |
| Highest Queuing Delay | 1 |

Figure 8:
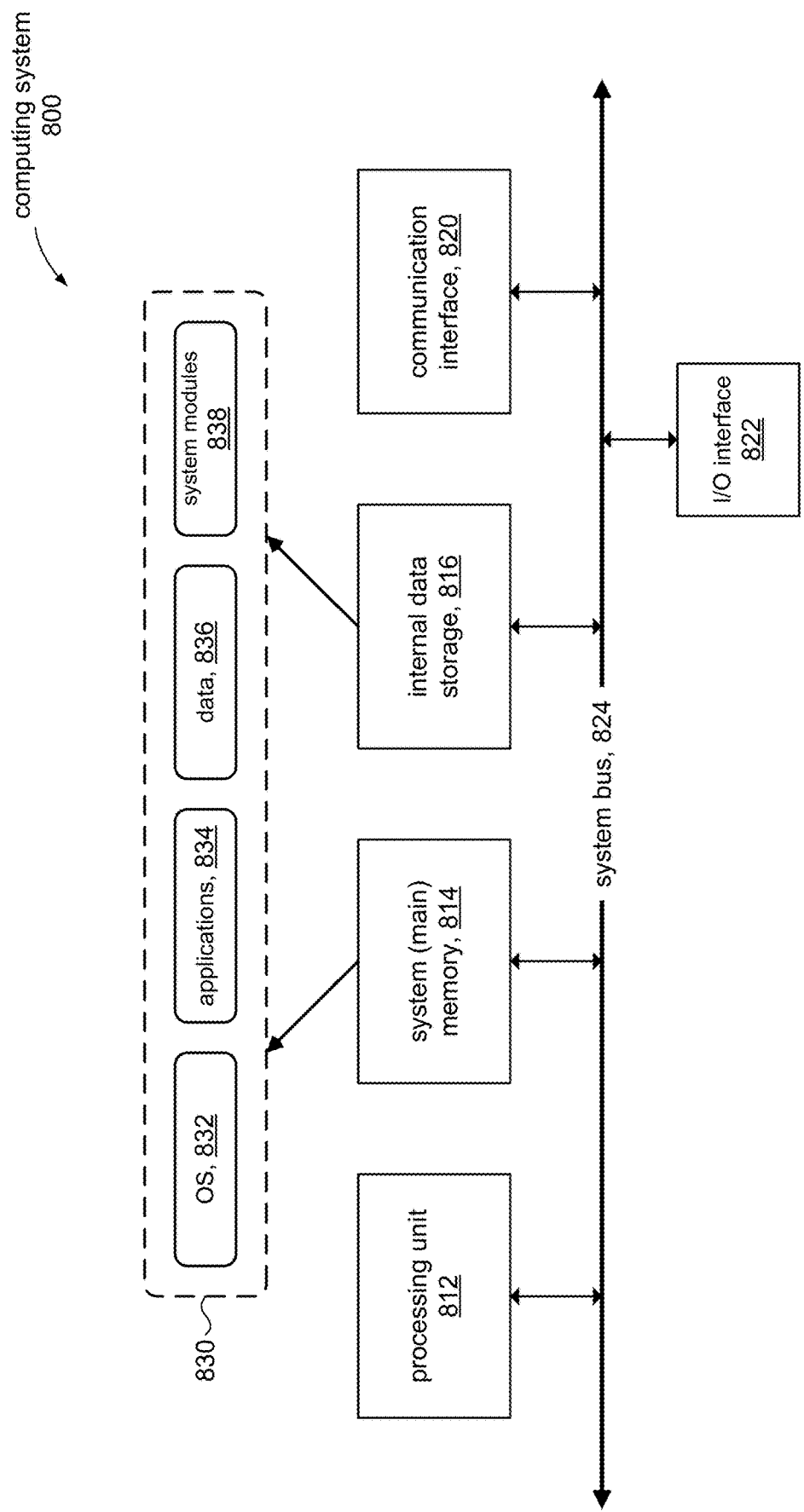
FIG. 8 shows an illustrative computing system adapted in accordance with the present disclosure.

FIG. 8 is a simplified block diagram of an illustrative computing system 800 for implementing one or more of the embodiments described herein (e.g., AP 102, FIG. 1). The computing system 800 can perform and/or be a means for performing, either alone or in combination with other elements, operations in accordance with the present disclosure. Computing system 800 can also perform and/or be a means for performing any other steps, methods, or processes described herein.

Computing system 800 can include any single- or multi-processor computing device or system capable of executing computer-readable instructions. In a basic configuration, computing system 800 can include at least one processing unit 812 and a system (main) memory 814.

Processing unit 812 can comprise any type or form of processing unit capable of processing data or interpreting and executing instructions. The processing unit 812 can be a single processor configuration in some embodiments, and in other embodiments can be a multi-processor architecture comprising one or more computer processors. In some embodiments, processing unit 812 can receive instructions from program and data modules 830. These instructions can cause processing unit 812 to perform operations in accordance with the various disclosed embodiments (e.g., FIGS. 2, 4) of the present disclosure.

System memory 814 (sometimes referred to as main memory) can be any type or form of storage device or storage medium capable of storing data and/or other computer-readable instructions, and comprises volatile memory and/or non-volatile memory. Examples of system memory 814 include any suitable byte-addressable memory, for example, random access memory (RAM), read only memory (ROM), flash memory, or any other similar memory architecture.

In some embodiments, computing system 800 can include one or more components or elements in addition to processing unit 812 and system memory 814. For example, as illustrated in FIG. 8, computing system 800 can include internal data storage 816, a communication interface 820, and an I/O interface 822 interconnected via a system bus 824. System bus 824 can include any type or form of infrastructure capable of facilitating communication between one or more components comprising computing system 800.

Internal data storage 816 can comprise non-transitory computer-readable storage media to provide nonvolatile storage of data, data structures, computer-executable instructions, and so forth to operate computing system 800 in accordance with the present disclosure. For instance, the internal data storage 816 can store various program and data modules 830, including for example, operating system 832, one or more application programs 834, program data 836, and other program/system modules 838.

Communication interface 820 can include any type or form of communication device or adapter capable of facilitating communication between computing system 800 and one or more additional devices. For example, in some embodiments communication interface 820 can facilitate communication between computing system 800 and a private or public network including additional computing systems. Examples of communication interface 820 include, for example, a wired network interface (such as a network interface card), a wireless network interface (such as a wireless network interface card), a modem, and any other suitable interface. I/O interface 822 can provide physical access to computing system 800 via a suitable connector, to provide local access for an administrator for example.

FURTHER EXAMPLES

In accordance with the present disclosure, a method in a wireless access point (AP) can comprise initializing a maximum power detection level ($PD_{MAX}$) and updating a value of $PD_{MAX}$, including: receiving retry rates from a group of APs; determining a group retry rate ($RR_{SRG}$) based on the received retry rates; using $RR_{SRG}$ to trigger updating the value of $PD_{MAX}$, wherein updating the value of $PD_{MAX}$ includes incrementing or decrementing $PD_{MAX}$ based on $RR_{SRG}$; and broadcasting the updated value of $PD_{MAX}$. The method can further include detecting a transmit opportunity using the updated value of $PD_{MAX}$, including: detecting a signal level of a transmission that is less than the updated value of $PD_{MAX}$; determining a maximum transmit power ($TxPOWER_{MAX}$) level based on the detected signal level; selecting a client from among a plurality of clients based at least on $TxPOWER_{MAX}$; and transmitting a packet to the selected client.

In accordance with some embodiments, the method can further include receiving retry rates from the group of APs at predetermined intervals of time and determining the $RR_{SRG}$ in response to receiving the retry rates.

In accordance with some embodiments, updating the value of $PD_{MAX}$ is triggered in response to $RR_{SRG}$ being greater than or equal to a predetermined maximum retry rate.

In accordance with some embodiments, updating the value of $PD_{MAX}$ includes decrementing the value of $PD_{MAX}$ when $RR_{SRG}$ is greater than or equal to a predetermined maximum retry rate. In accordance with some embodiments, updating the value of $PD_{MAX}$ further includes decrementing the value of $PD_{MAX}$ only when the value of $PD_{MAX}$ is greater than a minimum power detection level by a predetermined margin.

In accordance with some embodiments, updating the value of $PD_{MAX}$ includes incrementing the value of $PD_{MAX}$ when the $RR_{SRG}$ is less than a predetermined maximum retry rate. In accordance with some embodiments, updating the value of $PD_{MAX}$ further includes incrementing the value of $PD_{MAX}$ only when the value of $PD_{MAX}$ is less than a maximum power detection level by a predetermined margin.

In accordance with some embodiments, $RR_{SRG}$ is a maximum retry rate among the received retry rates and a local retry rate of the AP.

In accordance with some embodiments, determining $RR_{SRG}$ includes excluding retry rates that are computed from fewer than a predetermined number of transmitted packets.

In accordance with some embodiments, selecting a client from among a plurality of clients includes excluding clients that have a minimum transmit power requirement that exceeds the $TxPOWER_{MAX}$ level.

In accordance with some embodiments, selecting a client from among a plurality of clients includes excluding clients that require a transmission time that exceeds a predetermined duration.

In accordance with the present disclosure, a network device can comprise one or more computer processors and a computer-readable storage medium comprising instructions for controlling the one or more computer processors to repeatedly update a value of a power detection level ($PD_{MAX}$) that is used to identify wireless transmission opportunities in a wireless network, including: (a) receiving retry rates from a group of network devices; (b) updating the value of $PD_{MAX}$ based on the received retry rates; (c) broadcasting the updated value of $PD_{MAX}$, wherein stations associated with the network device receive the updated value of $PD_{MAX}$; and (d) repeating a-c, wherein the network device and stations associated with the network device use the value of $PD_{MAX}$ to identify wireless transmission opportunities.

In accordance with some embodiments, the computer-readable storage medium further comprises instructions for controlling the one or more computer processors to: determine a group retry rate ($RR_{SRG}$) based on the received retry rates; and update the value of $PD_{MAX}$ in response to $RR_{SRG}$ being greater than a predetermined value.

In accordance with some embodiments, the computer-readable storage medium further comprises instructions for controlling the one or more computer processors to update the value of $PD_{MAX}$ by decrementing the value of $PD_{MAX}$ when $RR_{SRG}$ is greater than or equal to the predetermined value and incrementing the value of $PD_{MAX}$ when the $RR_{SRG}$ is less than the predetermined value.

In accordance with some embodiments, updating the value of $PD_{MAX}$ is based on a maximum retry rate among the received retry rates and a local retry rate of the AP. In accordance with some embodiments, retry rates that are computed from fewer than a predetermined number of transmitted packets are excluded from consideration as being the maximum retry rate.

In accordance with the present disclosure, a method in a wireless access point (AP), the method comprising the AP: computing a retry rate; in response to the retry rate being greater than a predetermined retry rate, updating a value of $PD_{MAX}$ by incrementing or decrementing the value of $PD_{MAX}$ based on the computed retry rate; and detecting a transmit opportunity using the updated value of $PD_{MAX}$ including: detecting presence of a transmission having a signal level that is less than the updated value of $PD_{MAX}$; selecting a client from among a plurality of clients associated with the AP; and transmitting a packet to a selected client.

In accordance with some embodiments, the method can further include periodically repeating computing the retry rate and updating the value of $PD_{MAX}$.

In accordance with some embodiments, selecting a client from among a plurality of clients includes excluding clients that have a minimum transmit power requirement that exceeds a maximum allowed transmit power level determined based on the signal level of the detected transmission.

In accordance with some embodiments, selecting a client includes excluding clients that require a transmission time that exceeds a predetermined duration.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a wireless access point (AP), the method comprising the AP:
   initializing a maximum power detection level ($PD_{MAX}$);
   updating a value of $PD_{MAX}$, including:
      receiving retry rates from a group of APs;
      determining a group retry rate ($RR_{SRG}$) based on the received retry rates;
      using $RR_{SRG}$ to trigger updating the value of $PD_{MAX}$, wherein updating the value of $PD_{MAX}$ includes incrementing or decrementing $PD_{MAX}$ based on $RR_{SRG}$; and
      broadcasting the updated value of $PD_{MAX}$; and
   detecting a transmit opportunity using the updated value of $PD_{MAX}$, including:
      detecting a signal level of a transmission that is less than the updated value of $PD_{MAX}$;
      determining a maximum transmit power ($TxPOWER_{MAX}$) level based on the detected signal level;
      selecting a client from among a plurality of clients based at least on $TxPOWER_{MAX}$; and
      transmitting a packet to the selected client.

2. The method of claim 1, further comprising receiving retry rates from the group of APs at predetermined intervals of time and determining the $RR_{SRG}$ in response to receiving the retry rates.

3. The method of claim 1, wherein updating the value of $PD_{MAX}$ is triggered in response to $RR_{SRG}$ being greater than or equal to a predetermined maximum retry rate.

4. The method of claim 1, wherein updating the value of $PD_{MAX}$ includes decrementing the value of $PD_{MAX}$ when $RR_{SRG}$ is greater than or equal to a predetermined maximum retry rate.

5. The method of claim 4, wherein updating the value of $PD_{MAX}$ further includes decrementing the value of $PD_{MAX}$ only when the value of $PD_{MAX}$ is greater than a minimum power detection level by a predetermined margin.

6. The method of claim 1, wherein updating the value of $PD_{MAX}$ includes incrementing the value of $PD_{MAX}$ when the $RR_{SRG}$ is less than a predetermined maximum retry rate.

7. The method of claim 6, wherein updating the value of $PD_{MAX}$ further includes incrementing the value of $PD_{MAX}$ only when the value of $PD_{MAX}$ is less than a maximum power detection level by a predetermined margin.

8. The method of claim 1, wherein $RR_{SRG}$ is a maximum retry rate among the received retry rates and a local retry rate of the AP.

9. The method of claim 1, wherein determining $RR_{SRG}$ includes excluding retry rates that are computed from fewer than a predetermined number of transmitted packets.

10. The method of claim 1, wherein selecting a client from among a plurality of clients includes excluding clients that have a minimum transmit power requirement that exceeds the $TxPOWER_{MAX}$ level.

11. The method of claim 1, wherein selecting a client from among a plurality of clients includes excluding clients that require a transmission time that exceeds a predetermined duration.

12. A network device comprising:
   one or more computer processors; and
   a non-transitory computer-readable storage medium comprising instructions for controlling the one or more computer processors to:
   repeatedly update a value of a power detection level ($PD_{MAX}$) that is used to identify wireless transmission opportunities in a wireless network, including:
      a) receiving retry rates from a group of network devices;
      b) updating the value of $PD_{MAX}$ based on the received retry rates;
      c) broadcasting the updated value of $PD_{MAX}$, wherein stations associated with the network device receive the updated value of $PD_{MAX}$; and
      d) repeating a-c, wherein the network device and stations associated with the network device use the value of $PD_{MAX}$ to identify wireless transmission opportunities.

13. The network device of claim 12, wherein the computer-readable storage medium further comprises instructions for controlling the one or more computer processors to:
determine a group retry rate ($RR_{SRG}$) based on the received retry rates; and
update the value of $PD_{MAX}$ in response to $RR_{SRG}$ being greater than a predetermined value.

14. The network device of claim 13, wherein the computer-readable storage medium further comprises instructions for controlling the one or more computer processors to update the value of $PD_{MAX}$ by decrementing the value of $PD_{MAX}$ when $RR_{SRG}$ is greater than or equal to the predetermined value and incrementing the value of $PD_{MAX}$ when the $RR_{SRG}$ is less than the predetermined value.

15. The network device of claim 12, wherein updating the value of $PD_{MAX}$ is based on a maximum retry rate among the received retry rates and a local retry rate of the AP.

16. The network device of claim 15, wherein retry rates that are computed from fewer than a predetermined number of transmitted packets are excluded from consideration as being the maximum retry rate.

17. A method in a wireless access point (AP), the method comprising the AP:
computing a retry rate;
in response to the retry rate being greater than a predetermined retry rate, updating a value of $PD_{MAX}$ by incrementing or decrementing the value of $PD_{MAX}$ based on the computed retry rate; and
detecting a transmit opportunity using the updated value of $PD_{MAX}$, including:
detecting presence of a transmission having a signal level that is less than the updated value of $PD_{MAX}$;
selecting a client from among a plurality of clients associated with the AP; and
transmitting a packet to a selected client.

18. The method of claim 17, further comprising periodically repeating computing the retry rate and updating the value of $PD_{MAX}$.

19. The method of claim 17, wherein selecting a client from among a plurality of clients includes excluding clients that have a minimum transmit power requirement that exceeds a maximum allowed transmit power level determined based on the signal level of the detected transmission.

20. The method of claim 17, wherein selecting a client includes excluding clients that require a transmission time that exceeds a predetermined duration.

* * * * *